(12) United States Patent
Kozuka

(10) Patent No.: US 10,081,362 B2
(45) Date of Patent: Sep. 25, 2018

(54) BRAKING FORCE CONTROL SYSTEM

(71) Applicant: TOYOTA JIDOSHA KABUSHIKI KAISHA, Toyota-shi, Aichi-ken (JP)

(72) Inventor: Tomoyuki Kozuka, Sunto-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/633,299

(22) Filed: Jun. 26, 2017

(65) Prior Publication Data
US 2018/0009440 A1  Jan. 11, 2018

(30) Foreign Application Priority Data

Jul. 8, 2016 (JP) .................................. 2016-136265

(51) Int. Cl.
| | | |
|---|---|---|
| *B60W 10/06* | (2006.01) | |
| *B60T 7/12* | (2006.01) | |
| *B60W 30/18* | (2012.01) | |
| *B60W 30/14* | (2006.01) | |

(52) U.S. Cl.
CPC .... *B60W 30/18109* (2013.01); *B60W 30/146* (2013.01); *B60W 2510/18* (2013.01); *B60W 2550/30* (2013.01)

(58) Field of Classification Search
CPC ... B60W 30/18109; B60W 10/06; B60T 7/12; B60K 31/0066
See application file for complete search history.

(56) References Cited

U.S. PATENT DOCUMENTS

| | | | | |
|---|---|---|---|---|
| 2009/0025996 A1* | 1/2009 | Inoue | ................. | B60K 31/0066 180/179 |
| 2009/0048746 A1* | 2/2009 | Kaigawa | ............... | B60W 10/06 701/54 |
| 2016/0185327 A1* | 6/2016 | Ishida | ...................... | B60T 7/12 701/74 |

FOREIGN PATENT DOCUMENTS

JP  2011-183983 A  9/2011

* cited by examiner

*Primary Examiner* — Yuri Kan
(74) *Attorney, Agent, or Firm* — Oliff PLC

(57) ABSTRACT

A braking force control system includes: a brake device and at least one electronic control unit. The brake device is configured to generate a braking force commensurate with a brake operation amount of a driver. At least one electronic control unit is configured to execute vehicle speed control for controlling a speed of a vehicle to a target speed by controlling a driving force and a braking force. The electronic control unit is configured to cause the brake device to generate an actual braking force corresponding to a total value of an additional braking force and an operational braking force when brake operation is performed during execution of the vehicle speed control. The additional braking force corresponds to a controlled braking force required by the vehicle speed control. The operational braking force is required through the brake operation.

8 Claims, 8 Drawing Sheets

BRAKING FORCE CONTROL SYSTEM

INCORPORATION BY REFERENCE

The disclosure of Japanese Patent Application No. 2016-136265 filed on Jul. 8, 2016 including the specification, drawings and abstract is incorporated herein by reference in its entirety.

BACKGROUND

1. Technical Field

This disclosure relates to a braking force control system.

2. Description of Related Art

Japanese Patent Application Publication No. 2011-183983 (JP 2011-183983 A) describes a vehicle having the function of adaptive cruise control (ACC) including inter-vehicle distance control and constant speed control. The inter-vehicle distance control causes a host vehicle to follow a preceding vehicle while keeping a target inter-vehicle distance. On the other hand, the constant speed control causes a host vehicle to travel while keeping a target vehicle speed when there is no preceding vehicle to follow.

The ACC is usually cancelled when a driver performs brake operation. By cancelling the ACC in this way, it is possible to immediately return the initiative of vehicle speed control to the driver at the time when the driver requires braking force. On the other hand, when the ACC is cancelled through driver's slight brake operation, braking force that has been generated before the cancellation disappears, with the result that the driver may experience a drop of braking force.

In order to take measures against this problem, the system described in JP 2011-183983 A does not cancel the ACC when the driver performs slight brake operation during execution of the ACC. Moreover, this system causes the host vehicle to generate a larger one of braking force that is required from the ACC and braking force that is required through brake operation.

SUMMARY

The system described in JP 2011-183983 A is able to prevent a large drop of braking force resulting from slight brake operation. For this reason, this system is able to reduce a feeling of strangeness that is experienced by a driver at the time when the driver performs brake operation under the ACC.

Incidentally, a driver of a vehicle under the ACC performs brake operation in a situation that the driver feels a need for further braking force in addition to braking force generated by the ACC. However, in the system described in JP 2011-183983 A, if braking force that is required through brake operation does not exceed braking force generated by the ACC, braking force is just kept after the start of brake operation as well. Even when braking force generated through brake operation exceeds brake force generated by the ACC, the increment of braking force is slight. In any case, there is a concern that the driver experiences a feeling of strangeness from a change in braking force in response to brake operation performed by the driver. In this way, the system described in JP 2011-183983 A does not eliminate a feeling of strangeness that is experienced by a driver when the driver performs brake operation during execution of vehicle speed control accompanied by braking force.

This disclosure provides a braking force control system that can achieve deceleration without a feeling of strangeness that is experienced by a driver when the driver performs brake operation during execution of vehicle speed control accompanied by braking force.

An aspect of the disclosure provides a braking force control system. The braking force control system according to the aspect includes: a brake device and at least one electronic control unit. A brake device is configured to generate a braking force commensurate with a brake operation amount of a driver. At least one electronic control unit is configured to execute vehicle speed control for controlling a speed of a vehicle to a target speed by controlling a driving force and a braking force, and when brake operation is performed during execution of the vehicle speed control, cause the brake device to generate an actual braking force corresponding to a total value of an additional braking force and an operational braking force. The additional braking force corresponds to a controlled braking force required by the vehicle speed control. The operational braking force is required through the brake operation.

With the above configuration, it is possible to control the speed of the vehicle to the target speed by executing the vehicle speed control. When the driver feels a need for braking force during execution of the vehicle speed control, the driver performs brake operation. At this time, the actual braking force that is a total of the additional braking force corresponding to the controlled braking force and the operational braking force corresponding to the brake operation is generated. In this case, the braking force for which the driver feels a need is added to the braking force generated under the vehicle speed control, so deceleration without a feeling of strangeness to the driver is achieved.

In the aspect of the disclosure, the at least one electronic control unit may be configured to, when brake operation is performed during execution of the vehicle speed control, cancel a command to execute the vehicle speed control, store a controlled braking force at a point in time at which the brake operation is performed, as a braking force stored value, and compute the additional braking force based on the braking force stored value.

With the above configuration, it is possible to return the initiative of control over braking force to the driver simultaneously with the start of brake operation. With this configuration, the additional braking force is computed on the basis of the controlled braking force that has been already generated at the point in time at which brake operation has been started. For this reason, with this configuration, when brake operation has been performed during execution of the vehicle speed control, it is possible to smoothly proceed with switching from the controlled braking force to the actual braking force.

In the aspect of the disclosure, the at least one electronic control unit may be configured to, when brake operation is performed during execution of the vehicle speed control, store a brake operation amount at the point in time at which the brake operation is performed, as an operation amount stored value, and compute the additional braking force based on the braking force stored value and a ratio of a current brake operation amount to the operation amount stored value.

With the above configuration, it is possible to store a brake operation amount that has been started under execution of the vehicle speed control, as an operation amount stored value. By using the ratio of the current brake operation amount to the operation amount stored value, it is possible to also cause the additional braking force to reflect driver's intention. For this reason, with this configuration, even when brake operation has been started through an interrupt in the middle of the vehicle speed control, it is possible to provide the driver with an operational feeling without a feeling of strangeness.

In the aspect of the disclosure, the at least one electronic control unit may be configured to limit an upper limit value of the additional braking force to the braking force stored value.

With the above configuration, by limiting the additional braking force to the braking force stored value, it is possible to prevent excessive response of the actual braking force to driver's brake operation.

In the aspect of the disclosure, the at least one electronic control unit may be configured to, when brake operation started during execution of the vehicle speed control is cancelled, eliminate the additional braking force.

With the above configuration, it is possible to eliminate the additional braking force at the time when brake operation is cancelled. Brake operation is cancelled at the time when the driver determines that there is no need for braking force. When the additional braking force is cancelled at this timing, it is possible to provide the driver with a braking feeling without a feeling of strangeness.

In the aspect of the disclosure, the at least one electronic control unit may be configured to, when the vehicle stops after a start of brake operation during execution of the vehicle speed control, eliminate the additional braking force.

With the above configuration, it is possible to eliminate the additional braking force at the time when the vehicle has stopped. When the vehicle has stopped, it is not necessary to generate a braking force for assisting driver's brake operation thereafter. With the above configuration, it is possible to prevent continuation of such useless assistance after a stop of the vehicle.

In the aspect of the disclosure, the brake device may be configured to generate a braking force commensurate with a command value from the at least one electronic control unit. The at least one electronic control unit may be configured to, during execution of the vehicle speed control, provide the brake device with a command commensurate with the controlled braking force. The at least one electronic control unit may be configured to, when brake operation is started during execution of the vehicle speed control, provide the brake device with a command commensurate with the actual braking force. And the at least one electronic control unit may be configured to, when brake operation is started not during execution of the vehicle speed control, provide the brake device with a command commensurate with the operational braking force.

With the above configuration, it is possible to achieve the mode of the disclosure in the brake by wire hardware configuration.

In the aspect of the disclosure, the braking force control system may further include a hydraulic pressure circuit. The hydraulic pressure circuit may be configured to provide the brake device with a hydraulic pressure commensurate with the brake operation amount of the driver. The brake device may be configured to generate a braking force commensurate with the hydraulic pressure and a braking force commensurate with a command value from the at least one electronic control unit. The at least one electronic control unit may be configured to during execution of the vehicle speed control, provide the brake device with a command commensurate with the controlled braking force, and when brake operation is started during execution of the vehicle speed control, provide the brake device with a command commensurate with the additional braking force.

With the above configuration, it is possible to achieve the mode of the disclosure in the non-brake by wire hardware configuration in which driver's brake operation is directly transmitted to the brake device by hydraulic pressure.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

First Embodiment

Configuration of First Embodiment

Figure 1:
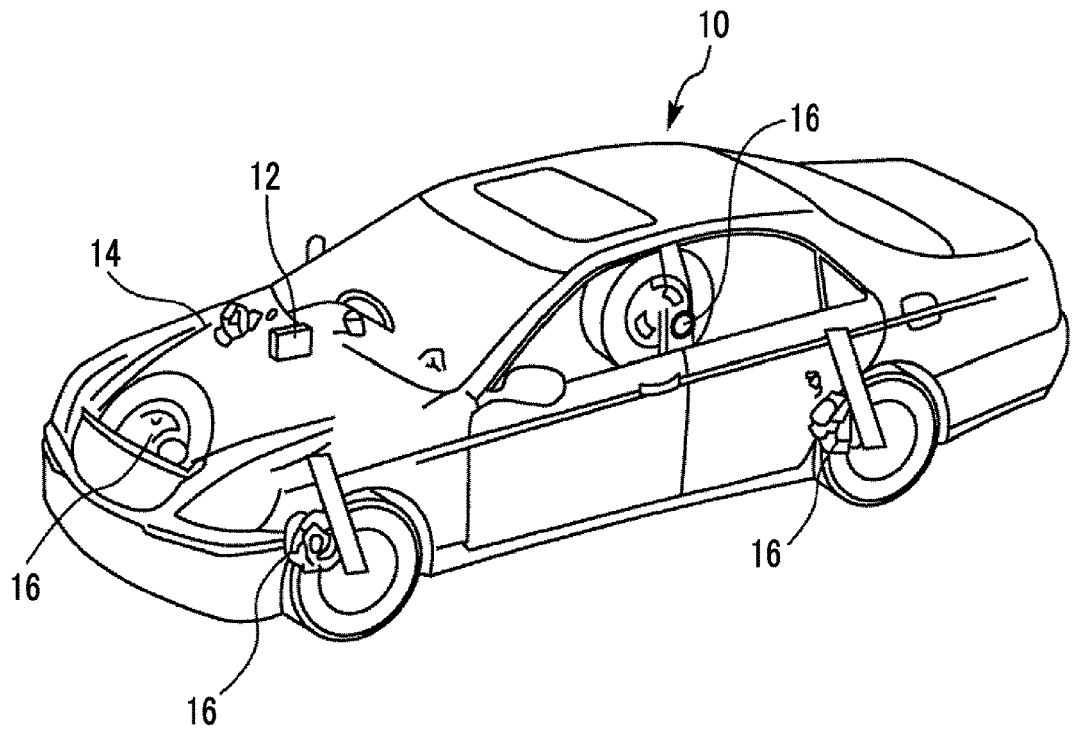
FIG. 1 is a perspective view of a vehicle on which a braking force control system according to a first embodiment of the disclosure is mounted.

FIG. 1 is a perspective view of a vehicle 10 on which a braking force control system according to a first embodiment of the disclosure is mounted. An electronic control unit (ACC-ECU) 12 is mounted on the vehicle 10. The ACC-ECU 12 has the function of executing adaptive cruise control (ACC) over the vehicle 10. The ACC includes inter-vehicle distance control and constant speed control. The inter-vehicle distance control is able to cause the vehicle 10 to follow a preceding vehicle while keeping a target inter-vehicle distance. The constant speed control is able to cause the vehicle 10 to travel while keeping a target vehicle speed when there is no preceding vehicle to follow.

A brake unit 14 is mounted on the vehicle 10. The brake unit 14 includes a brake ECU 30 and a brake actuator. The brake actuator further includes a stroke sensor and a master cylinder pressure sensor. The stroke sensor is able to detect the operation amount of a brake pedal (not shown). The master cylinder pressure sensor is able to detect hydraulic pressure generated inside the master cylinder that generates brake hydraulic pressure.

A brake device 16 is installed in each wheel of the vehicle 10. The vehicle 10 according to the present embodiment has a so-called brake by wire configuration. That is, a braking force command is supplied from the brake ECU of the brake unit 14 to each brake device 16. Each brake device 16 generates a braking force commensurate with the supplied command in a corresponding one of the wheels.

Figure 2:
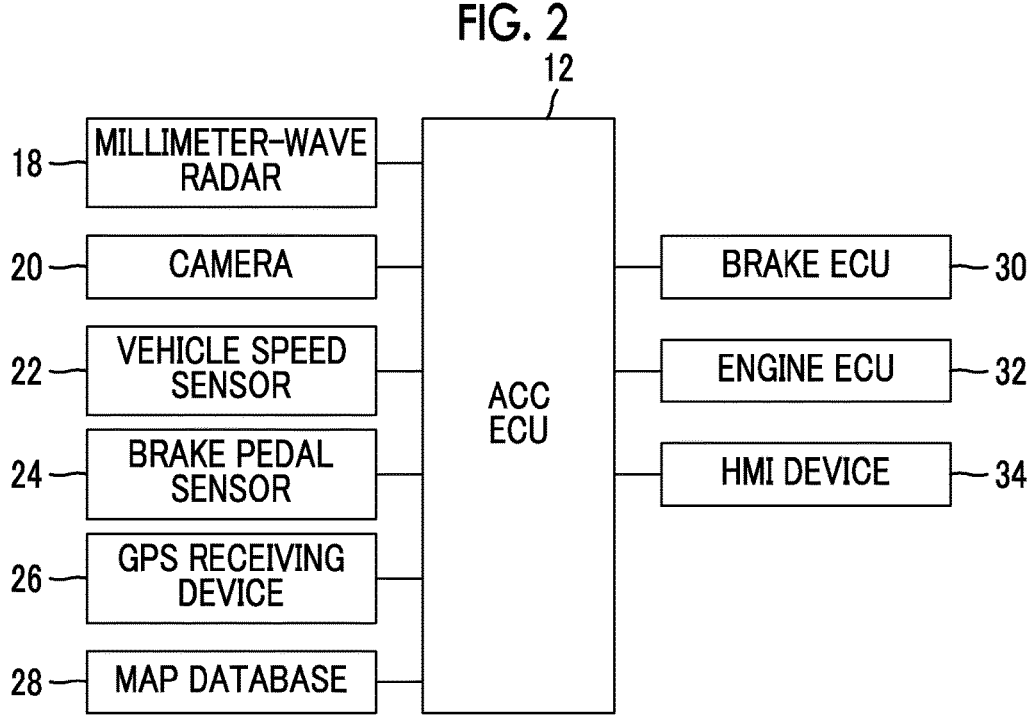
FIG. 2 is a block diagram of the braking force control system according to the first embodiment of the disclosure.

FIG. 2 is a block diagram of the braking force control system according to the present embodiment. As shown in FIG. 2, the braking force control system according to the present embodiment includes the above-described ACC-ECU 12. A millimeter-wave radar 18 and a camera 20 are connected to the ACC-ECU 12. The millimeter-wave radar 18 and the camera 20 are mounted on the vehicle 10 so as to be able to monitor a preceding vehicle. The ACC-ECU 12 is able to detect the presence or absence of a preceding vehicle, an inter-vehicle distance to the preceding vehicle, and the like, on the basis of information that is transmitted from the millimeter-wave radar 18 and the camera 20.

A vehicle speed sensor 22 and a brake pedal sensor 24 are connected to the ACC-ECU 12. The ACC-ECU 12 is able to detect the vehicle speed of the vehicle 10 on the basis of output from the vehicle speed sensor 22. The ACC-ECU 12 is able to detect the presence or absence of brake operation on the basis of output from the brake pedal sensor 24.

A global positioning system (GPS) receiving device 26 and a map database are connected to the ACC-ECU 12. The ACC-ECU 12 is able to detect the current position of the vehicle 10 on the basis of information that is provided from the GPS receiving device 26. The ACC-ECU 12 is able to detect the geographical traveling environment of the vehicle 10 on the basis of information that is provided from the map database.

The brake ECU 30, an engine ECU 32 and a human machine interface (HMI) device 34 are further connected to the ACC-ECU 12. The brake ECU 30 is an ECU that is included in the brake unit 14 as described above. The brake ECU 30 is a unit that issues a braking force command to the brake devices 16 of the wheels. An ON/OFF signal of the ACC and a signal indicating an ACC braking force Facc are supplied from the ACC-ECU 12 to the brake ECU 30. The ACC braking force Facc is a braking force that is required by the ACC. The brake ECU 30 is able to determine whether the ACC is being executed on the basis of those signals, and is able to detect the magnitude of braking force (Facc) to be generated in accordance with the ACC.

The HMI device 34 is arranged in a vehicle cabin. The ACC-ECU 12 is able to provide a driver with information, such as whether the ACC is being executed, with the use of the HMI device 34.

Problem Resulting from Execution of ACC

The ACC executes speed control over the vehicle 10 on behalf of the driver. When the driver feels that the braking force is insufficient and performs brake operation during execution of the ACC, it is desirable to quickly return the initiative of speed control from the ACC-ECU 12 to the driver. However, if the ACC is simply finished together with the start of brake operation, there occurs an inconvenience as will be described below.

Figure 3:
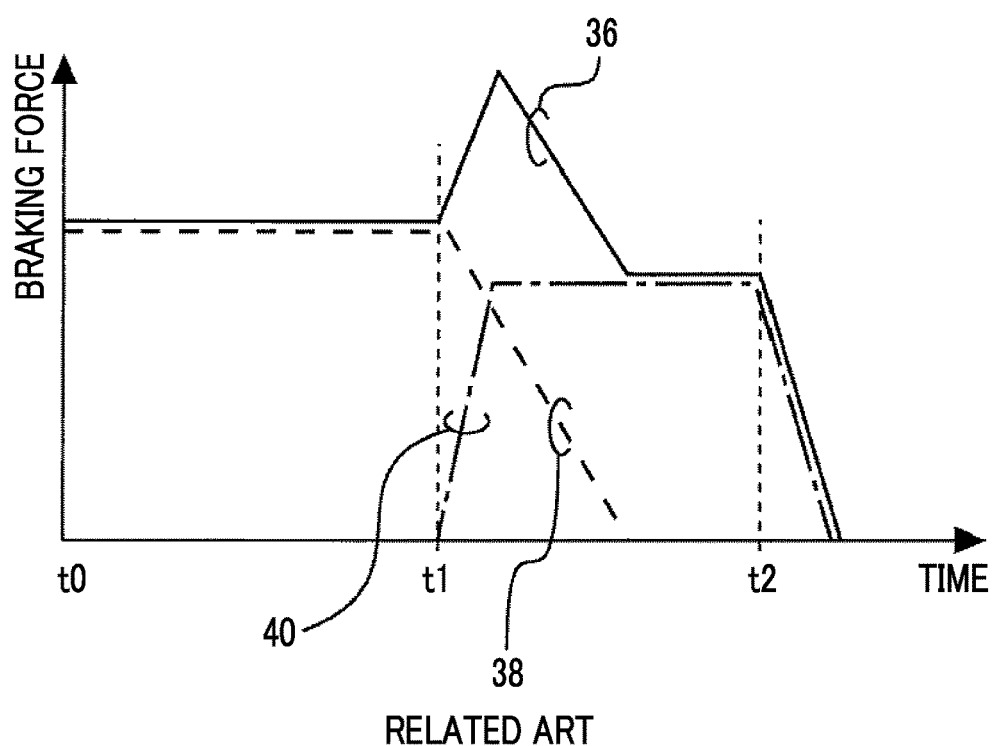
FIG. 3 is a timing chart for illustrating a problem to be solved by the braking force control system according to the first embodiment of the disclosure.

FIG. 3 is a timing chart for illustrating a problem that can occur when brake operation has been performed under execution of the ACC. In FIG. 3, the solid-line waveform indicated by the reference numeral 36 represents an actual braking force that is generated in the vehicle 10. The dashed-line waveform indicated by the reference numeral 38 represents a braking force that is required by the ACC (hereinafter, referred to as ACC braking force). The alternate long and short dashed-line waveform indicated by the reference numeral 40 in FIG. 3 represents a braking force that is required through driver's brake operation (hereinafter, referred to as operational braking force).

In the example shown in FIG. 3, the operational braking force 40 rises at time t1, and the operational braking force 40 disappears after time t2. This operation means that brake operation has been performed at substantially a constant operation amount from time t1 to time t2.

In the example shown in FIG. 3, the ACC is being executed at time t0. As brake operation is started at time t1, the ACC braking force 38 disappears in response to the start of the brake operation. This operation is achieved, for example, when execution of the ACC is cancelled along with the start of brake operation and the ACC braking force 38 is eliminated simultaneously with the cancellation of the ACC.

After time t1, when the ACC braking force 38 disappears in this way, the actual braking force 36 temporarily increases after the start of brake operation; however, the actual braking force 36 turns to reduction immediately thereafter. Although a constant brake operation amount is kept, the actual braking force 36 converges to a value smaller than the ACC braking force 38 at time t1.

At time t1, the driver feels a need for further braking force and starts brake operation. When the actual braking force 36 shows changes as described above, the driver feels a drop of braking force and tends to experience a feeling of strangeness.

Feature of First Embodiment

In order to prevent occurrence of such a feeling of strangeness, when brake operation has been started during execution of the ACC, the braking force control system according to the present embodiment generates the operational braking force commensurate with a brake operation amount while the ACC braking force that has been already generated at that point in time remains unchanged. With the above control, it is possible to increase the actual braking force as intended by the driver, and it is possible to achieve deceleration without a feeling of strangeness.

Figure 4:
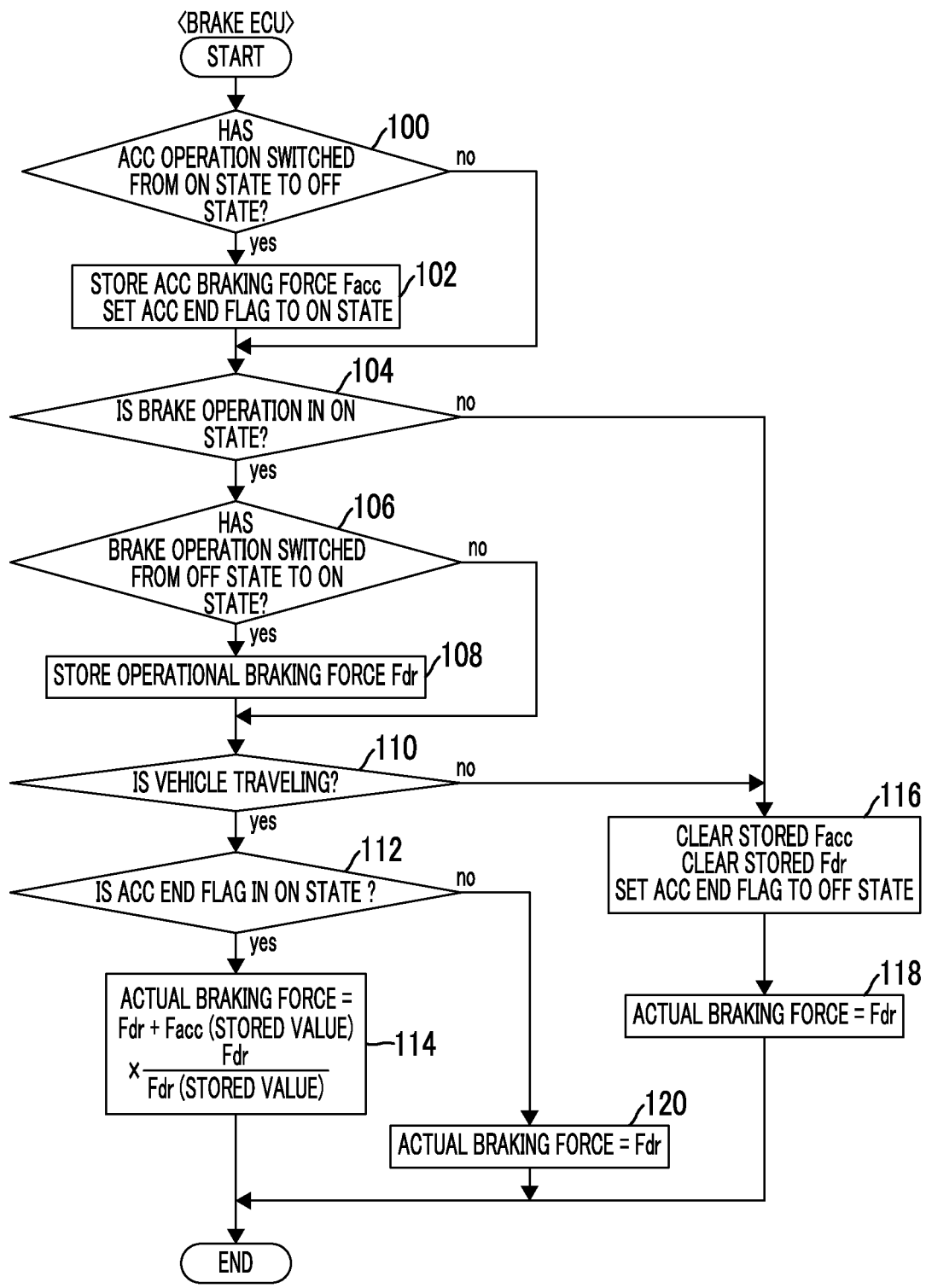
FIG. 4 is a flowchart of a routine that is executed in the first embodiment of the disclosure.

FIG. 4 is a flowchart of a routine that is executed by the brake ECU 30 in the present embodiment. The routine shown in FIG. 4 is repeatedly executed at predetermined intervals after the start of the vehicle 10.

In the routine shown in FIG. 4, initially, it is determined whether the operation of the ACC has switched from an on state to an off state on the basis of information that is provided from the ACC-ECU 12 (step 100). The ACC-ECU 12 sets the ACC to the on state when an ACC switch is turned on by the driver. When brake operation is detected during execution of the ACC, the ACC-ECU 12 sets the ACC to the off state in order to return the initiative of vehicle speed control to the driver. Therefore, the condition of step 100 holds when brake operation has been started in a period from the last processing cycle to the current processing cycle under execution of the ACC.

When it is determined in step 100 that the operation of the ACC has switched from the on state to the off state, it is determined that brake operation has been started during execution of the ACC. In this case, subsequently, the ACC braking force Facc generated at that point in time is stored, and an ACC end flag is set to an on state (step 102). Hereinafter, the ACC braking force stored in this step is referred to as Facc (stored value).

On the other hand, when it is determined in step 100 that the ACC has not switched from the on state to the off state, the process of step 102 is skipped. That is, when the ACC remains in the on state or in the off state in the period from the last processing cycle to the current processing cycle, the process of step 102 is skipped.

As the above-described process ends, it is subsequently determined whether brake operation is in an on state, that is, brake operation is being performed (step 104). When brake operation is in the on state, it is further determined whether brake operation has switched from an off state to the on state in the period from the last processing cycle to the current processing cycle (step 106).

When affirmative determination is made in step 106, it is determined that it is the timing just after brake operation has been started. In this case, an operational braking force Fdr that is required through a brake operation amount at that point in time is stored (step 108). Hereinafter, the operational braking force stored in this step is referred to as Fdr (stored value). On the other hand, when negative determination is made in step 106, it is determined that brake operation has been already started at the point in time of the current processing cycle. In this case, the process of step 108 is skipped.

In the brake ECU 30, subsequently, it is determined whether the vehicle 10 is traveling (step 110). When it is determined that the vehicle 10 is traveling, it is further determined whether the ACC end flag is in the on state (step 112).

As described above, the ACC end flag is set to the on state at the time when the operation of the ACC has been switched from the on state to the off state, that is, at the time when brake operation has been started under execution of the ACC. The process of step 112 is executed only when affirmative determination is made in both step 104 and step 110. For this reason, when affirmative determination is made in step 112, it is determined that the vehicle 10 is placed in the following situation.

(a) Brake operation has been started under execution of the ACC.
(b) Brake operation is being continued.
(c) The vehicle 10 has not stopped yet.

When affirmative determination is made in step 112, the brake ECU 30 computes the actual braking force in accordance with the following mathematical expression (step 114).

$$\text{Actual braking force} = Fdr + Facc(\text{stored value}) * Fdr/Fdr(\text{stored value}) \quad (1)$$

The first term "Fdr" on the right-hand side in the above-described mathematical expression (1) is the operational braking force Fdr in the current processing cycle. That is, the value Fdr is a braking force that is actually required by the driver through brake operation. In the above-described mathematical expression (1), Facc (stored value) and Fdr (stored value) of the second term on the right-hand side are respectively an ACC braking force Facc and an operational braking force Fdr at the start of brake operation (see step 102 and step 108). According to this second term, it is possible to calculate a value obtained by increasing or reducing the ACC braking force Facc (stored value) at the start of brake operation with an increase or reduction in the operational braking force Fdr after the start of brake operation. For this reason, with the above-described mathematical expression (1), it is possible to calculate the actual braking force that achieves the following two advantageous effects:

(a) At the time when brake operation has been started under the ACC, it is possible to generate the actual braking force obtained by adding the operational braking force Fdr required by the driver to the ACC braking force Facc that had been generated till then. With this actual braking force, the driver does not feel a drop of braking force at the start of brake operation.

(b) It is possible to change the actual braking force in response to an increase or reduction in brake operation amount after the start of the brake operation. If the actual braking force changes in this way, when brake control has been started through an interrupt in the middle of the ACC, it is possible to provide the driver with an operational feeling without a feeling of strangeness while providing assistance commensurate with the ACC braking force Facc.

The actual braking force calculated in step 114 is provided to the brake actuator and the brake devices 16 of the wheels as a command value. As a result, the actual braking force that achieves the above-described advantageous effects is generated in the vehicle 10. As the above-described process ends, the routine shown in FIG. 4 ends the current processing cycle.

After brake operation has been started under the ACC, the driver ends brake operation at the point in time at which the driver does not feel a need for braking force. When brake operation is ended in this way, it is determined in step 104 in the routine shown in FIG. 4 that brake operation is not in the on state. In this case, the brake ECU 30 clears Facc (stored value), clears Fdr (stored value), and sets the ACC end flag to the off state (step 116).

Subsequently, the actual braking force is set to the operational braking force Fdr detected in the current processing cycle (step 118). Here, brake operation is in the off state, and the operational braking force Fdr is zero, so the actual braking force is substantially set to zero.

In this way, with the routine shown in FIG. 4, it is possible to quickly set the actual braking force to zero at the point in time at which the driver ends brake operation. For this reason, with the braking force control system according to the present embodiment, it is possible to provide the driver with an operational feeling without a feeling of strangeness at the end of brake operation as well.

When brake operation is started under execution of the ACC and, after that, the vehicle 10 has stopped, it is determined in step 110 that the vehicle is not traveling. In this case as well, the processes of step 116 and step 118 are executed. After the vehicle 10 has stopped, the actual braking force no longer needs to reflect Facc (stored value). With the above-described process, it is possible to leave only the operational braking force Fdr intended by the driver as the actual braking force by clearing Facc (stored value) and Fdr (stored value). In this respect as well, the braking force control system according to the present embodiment is able to provide the driver with an operational feeling without a feeling of strangeness.

As described above, the ACC end flag is set to the off state at the point in time at which brake operation started under the ACC has been cancelled or at the point in time at which the vehicle 10 has stopped through that operation (see step 116) From then on, as the routine shown in FIG. 4 is executed, it is determined in step 112 that the ACC end flag is not in the on state. In this case, the operational braking force Fdr detected in the current processing cycle is set for the actual braking force (step 120). With this process, it is possible to provide the driver with an ordinary brake function.

Figure 5:
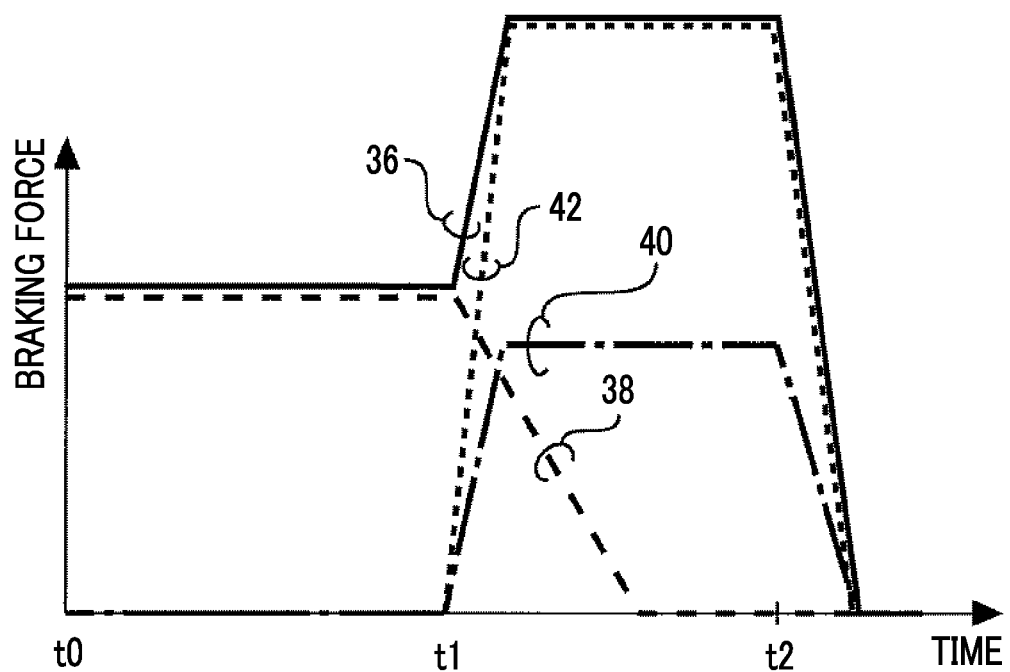
FIG. 5 is a timing chart for illustrating the operation of the first embodiment of the disclosure.

FIG. 5 is a timing chart for illustrating the operation of the braking force control system according to the present embodiment. In FIG. 5, the ACC braking force 38 and the operational braking force 40 are the same as those shown in FIG. 3. In FIG. 5, the actual braking force that is raised in the process of step 114 is indicated by the dashed line 42. In FIG. 5, the actual braking force indicated by the reference numeral 36 represents a variation in actual braking force that is generated in the vehicle 10 continuously from the time when the ACC is being executed.

As shown in FIG. 5, according to the present embodiment, while the brake operation amount is kept at a constant value after brake operation has been started, it is possible to generate the stable actual braking force 36. In this way, with the braking force control system according to the present embodiment, it is possible to effectively solve the problem regarding a drop of braking force, which has been described with reference to FIG. 3.

Alternative Embodiment to First Embodiment

Incidentally, in the above-described first embodiment, the ACC is used as control that is executed in the vehicle 10 for vehicle speed control; however, the disclosure does not limit the control to the ACC. That is, the ACC in the first embodiment may be replaced with simple speed control that does not include inter-vehicle distance control.

In the above-described first embodiment, at the time when the actual braking force is computed in step 114, a variation in operational braking force Fdr is incorporated together with Facc (stored value); however, the disclosure is not limited to this configuration. For example, in step 114, the actual braking force may be calculated by simply adding Facc (stored value) to the operational braking force Fdr.

In the above-described first embodiment, the ratio of Fdr to Fdr (stored value) is multiplied by Facc (stored value) in step 114. With this method, if Fdr is a value larger than Fdr (stored value), the multiplied result is larger than Facc (stored value). In this case, the actual braking force can be larger than a braking force intended by the driver. For this reason, in step 114, the multiplied result may be limited to Facc (stored value) or below. With this process, it is possible to effectively avoid excessive actual braking force when brake operation has been started through an interrupt in the middle of the ACC.

Second Embodiment

Configuration of Second Embodiment

Next, a braking force control system according to a second embodiment of the disclosure will be described with reference to FIG. 6 and FIG. 7 together with FIG. 1 and FIG. 2. The braking force control system according to the present embodiment includes the components shown in FIG. 1 and FIG. 2 as in the case of the first embodiment. However, the vehicle 10 has a brake by wire configuration in the first embodiment, whereas the vehicle 10 has a non-brake by wire configuration in the present embodiment.

That is, in the vehicle 10 according to the present embodiment, a hydraulic pressure commensurate with depression force exerted on the brake pedal is provided to the brake devices 16 of the wheels shown in FIG. 1 without intervening an electrical signal. The brake devices 16 are able to generate an operational braking force commensurate with the provided hydraulic pressure.

On the other hand, the brake unit 14 shown in FIG. 1 converts a braking force that is required from the ACC-ECU 12 or the brake ECU 30 to a command value and then provides the command value to the brake devices 16. The brake devices 16 are able to generate a braking force commensurate with the provided command value solely or in combination with the above-described operational braking force.

Operation of Second Embodiment

Figure 6:
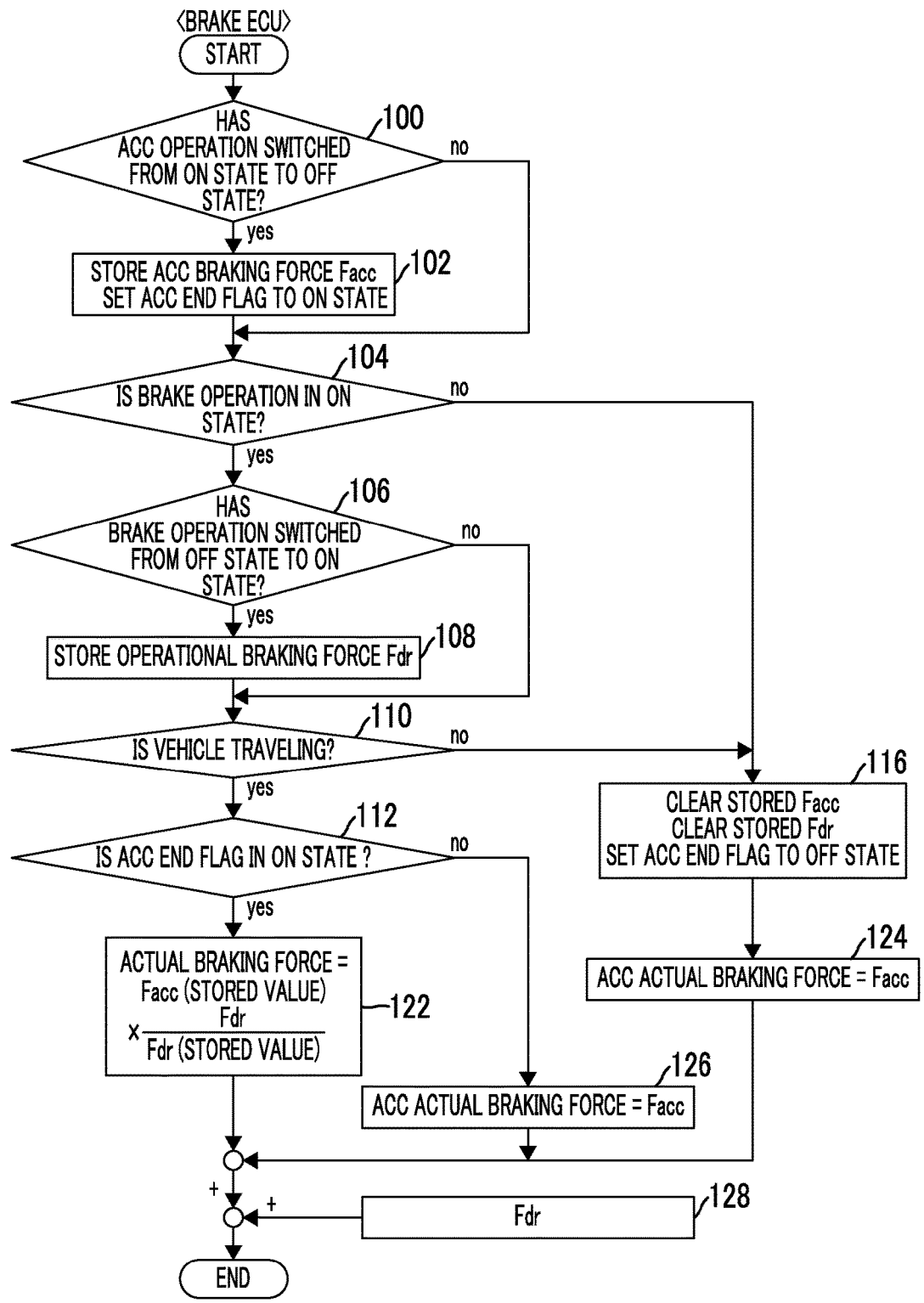
FIG. 6 is a flowchart of a routine that is executed in a second embodiment of the disclosure.

FIG. 6 is a flowchart of a routine that is executed by the brake ECU 30 in order to implement functions similar to those in the case of the first embodiment in the vehicle 10 having the above-described configuration. Hereinafter, in FIG. 6, like step numbers denote the same steps as those shown in FIG. 4, and the description thereof is omitted or simplified.

The routine shown in FIG. 6 is similar to the routine shown in FIG. 4 except the following points.
(a) Step 114, step 118 and step 120 are respectively replaced with step 122, step 124 and step 126.
(b) Step 128 is added upstream of the end step.
However, step 128 is added in order to visualize the addition of the operational braking force Fdr to the actual braking force, and does not represent a process that is executed by the brake ECU 30.

In the routine shown in FIG. 6, an ACC actual braking force is computed in accordance with the following mathematical expression in step 122.

$$\text{ACC actual braking force} = Facc(\text{stored value}) * Fdr / Fdr(\text{stored value}) \qquad (2)$$

A command value of the ACC actual braking force, calculated in this way, is provided to the brake devices 16 of the wheels. The brake devices 16 of the wheels generate a value obtained by adding the ACC actual braking force to the operational braking force Fdr as the actual braking force.

The right-hand side of the above-described mathematical expression (2) is equivalent to a mathematical expression obtained by excluding Fdr from the right-hand side of the mathematical expression (1) in the first embodiment. In the present embodiment, since depression force on the brake pedal directly generates the operational braking force Fdr, a command value that is provided to the brake devices 16 does not need to include Fdr. For this reason, once the ACC actual braking force expressed by the mathematical expression (2) is provided to the brake devices 16, an actual braking force similar to that in the case of the first embodiment is ensured in the vehicle 10.

In each of step 124 and step 126 shown in FIG. 6, the ACC braking force Facc is set as the ACC actual braking force. The ACC braking force Facc is a braking force that is required by the ACC. In principle, the ACC is executed under the condition that brake operation is not being performed. With the processes of step 124 and step 126, it is possible to cause the brake devices 16 to appropriately generate Facc that is required by the ACC.

Figure 7:
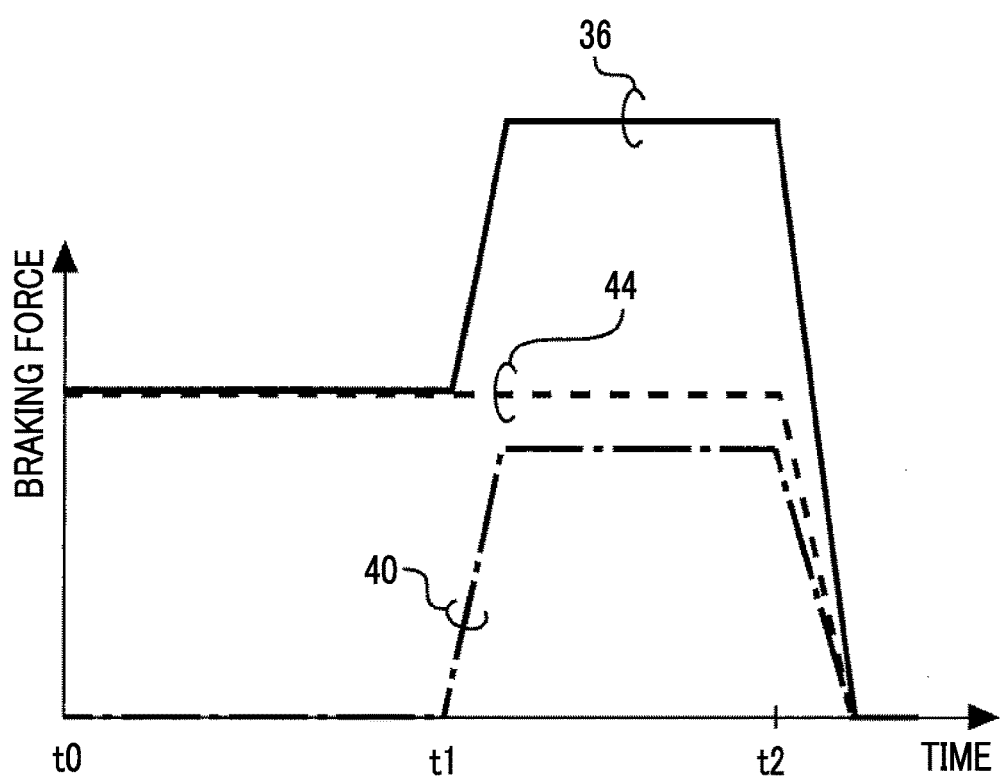
FIG. 7 is a timing chart for illustrating the operation of the second embodiment of the disclosure.

FIG. 7 is a timing chart for illustrating the operation of the braking force control system according to the present embodiment. In FIG. 7, the operational braking force 40 is similar to that shown in FIG. 3 or FIG. 5. The dashed-line waveform indicated by the reference numeral 44 in FIG. 7 represents an ACC actual braking force that is computed in the process of step 122, step 124 or step 126. In the present embodiment, since the operational braking force 40 is added to the ACC actual braking force 44, the actual braking force 36 is as shown in the timing chart. In this way, with the above-described routine shown in FIG. 6, it is possible to implement functions similar to those in the case of the first embodiment in the vehicle 10 having the non-brake by wire configuration.

Alternative Embodiment to Second Embodiment

In the above-described second embodiment, various computations at the time when brake operation has been performed under the ACC are executed in the brake ECU 30. However, the unit that executes those processes is not limited to the brake ECU 30. For example, an ACC braking force to be generated in accordance with the ACC may be computed in the ACC-ECU 12, and only the process of generating a braking force in accordance with the computed result may be executed in the brake ECU 30.

Figure 8:
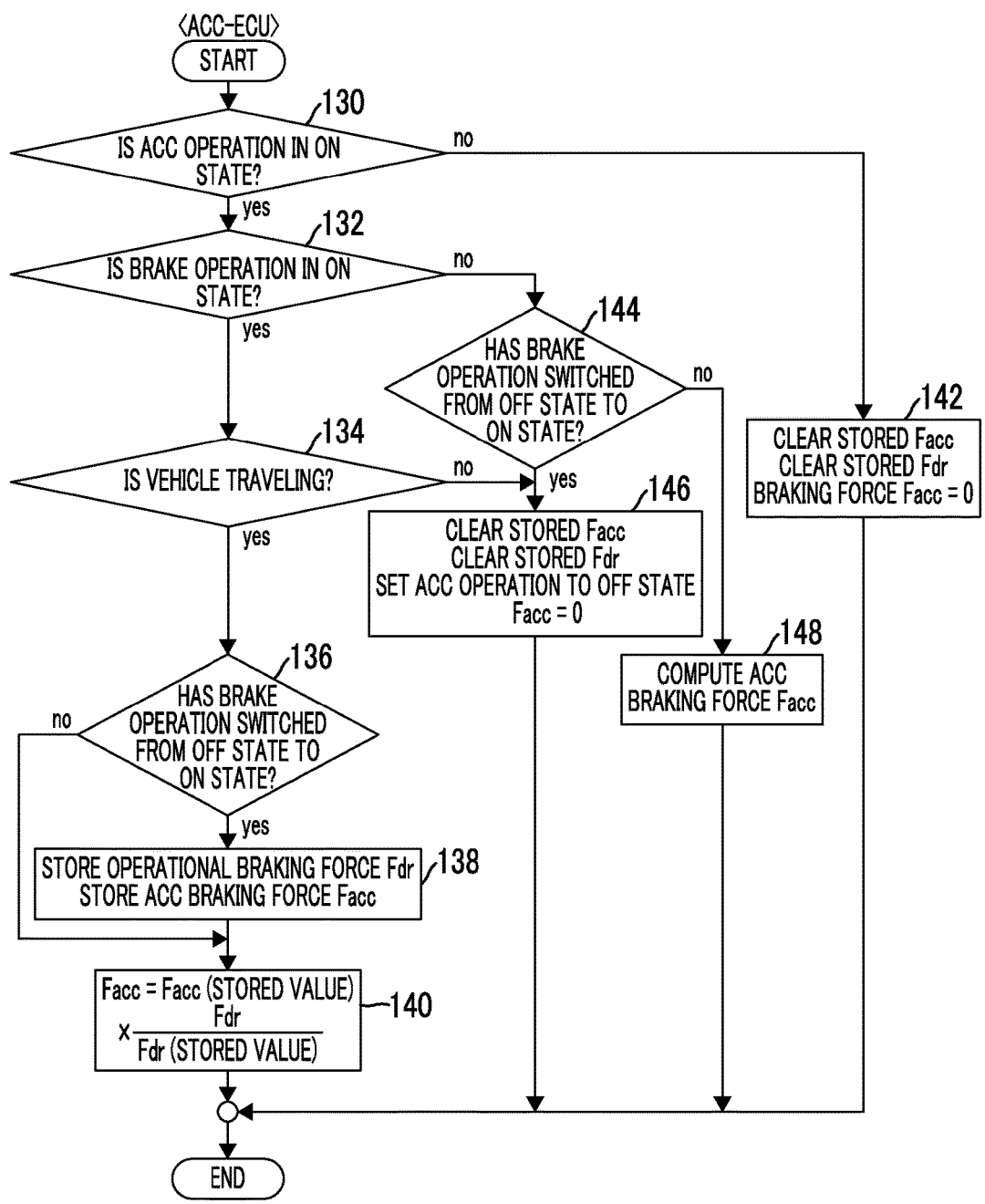
FIG. 8 is a flowchart of a routine that is executed by an ACC-ECU in an alternative embodiment to the second embodiment of the disclosure.
Figure 9:
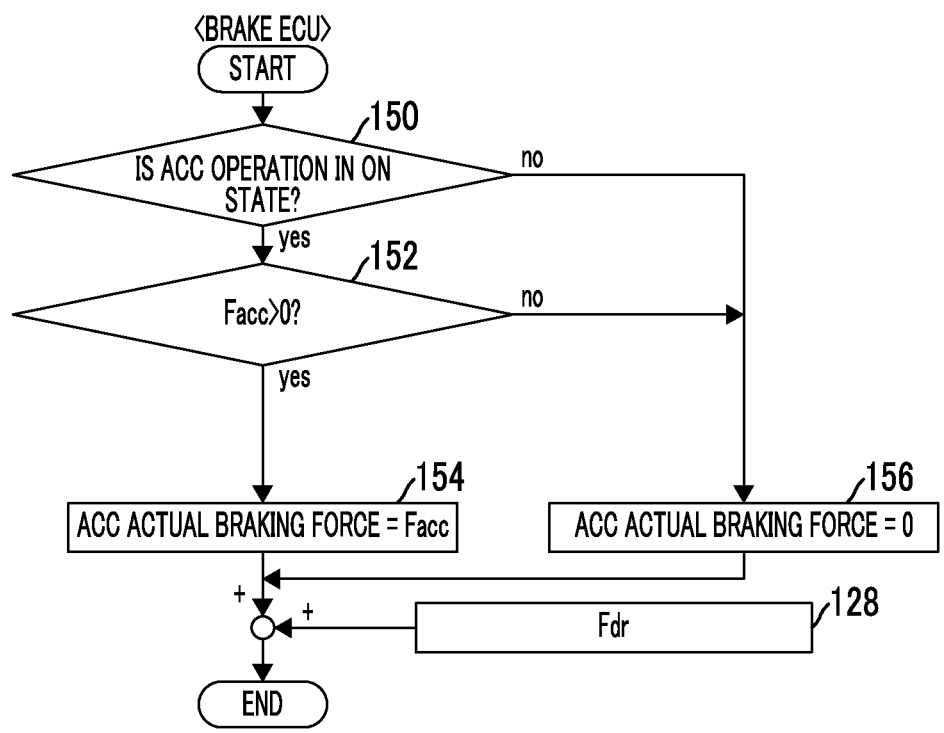
FIG. 9 is a flowchart of a routine that is executed by a brake ECU in the alternative embodiment to the second embodiment of the disclosure.

FIG. 8 and FIG. 9 show an example of flowcharts of routines that are executed by the ACC-ECU 12 and the brake ECU 30 in order to achieve the above-described alternative embodiment. The processes that are executed in these routines are substantially similar to the processes that are executed by the routine shown in FIG. 6, so the detailed description thereof is omitted.

Incidentally, in the above-described first and second embodiments, the ACC serves as vehicle speed control, the ACC braking force serves as controlled braking force, and the second term on the right-hand side of the mathematical expression (1) or the right-hand side of the mathematical expression (2) serves as additional braking force.

In the above-described first and second embodiments, Facc (stored value) serves as braking force stored value, and Fdr (stored value) serves as operation amount stored value.

In the above-described second embodiment, the mechanism that provides a hydraulic pressure commensurate with depression force on the brake pedal to the brake devices 16 of the wheels serves as a hydraulic pressure circuit.

What is claimed is:

1. A braking force control system comprising:
a brake device configured to generate a braking force commensurate with a brake operation amount of a driver; and
at least one electronic control unit configured to
execute vehicle speed control for controlling a speed of a vehicle to a target speed by controlling a driving force and a braking force, and
when brake operation is performed during execution of the vehicle speed control, cause the brake device to generate an actual braking force corresponding to a total value of an additional braking force and an operational braking force, the additional braking force corresponding to a controlled braking force, the controlled braking force being required by the vehicle speed control, the operational braking force being required through the brake operation.

2. The braking force control system according to claim 1, wherein the at least one electronic control unit is configured to
when the brake operation is performed during execution of the vehicle speed control, cancel a command to execute the vehicle speed control,
when the brake operation is performed during execution of the vehicle speed control, store a controlled braking force at a point in time at which the brake operation is performed, as a braking force stored value, and
compute the additional braking force based on the braking force stored value.

3. The braking force control system according to claim 2, wherein the at least one electronic control unit is configured to
when the brake operation is performed during execution of the vehicle speed control, store a brake operation amount at the point in time at which the brake operation is performed, as an operation amount stored value, and
compute the additional braking force based on the braking force stored value and a ratio of a current brake operation amount to the operation amount stored value.

4. The braking force control system according to claim 3, wherein
the at least one electronic control unit is configured to limit an upper limit value of the additional braking force to the braking force stored value.

5. The braking force control system according to claim 1, wherein
the at least one electronic control unit is configured to, when the brake operation started during execution of the vehicle speed control is cancelled, eliminate the additional braking force.

6. The braking force control system according to claim 1, wherein
the at least one electronic control unit is configured to, when the vehicle stops after a start of the brake operation during execution of the vehicle speed control, eliminate the additional braking force.

7. The braking force control system according to claim 1, wherein
the brake device is configured to generate a braking force commensurate with a command value from the at least one electronic control unit,
the at least one electronic control unit is configured to, during execution of the vehicle speed control, provide the brake device with a command commensurate with the controlled braking force,
the at least one electronic control unit is configured to, when the brake operation is started during execution of the vehicle speed control, provide the brake device with a command commensurate with the actual braking force, and
the at least one electronic control unit is configured to, when the brake operation is started not during execution of the vehicle speed control, provide the brake device with a command commensurate with the operational braking force.

8. The braking force control system according to claim 1, further comprising:
a hydraulic pressure circuit configured to provide the brake device with a hydraulic pressure commensurate with the brake operation amount of the driver, wherein
the brake device is configured to generate a braking force commensurate with the hydraulic pressure and a braking force commensurate with a command value from the at least one electronic control unit, and
the at least one electronic control unit is configured to
during execution of the vehicle speed control, provide the brake device with a command commensurate with the controlled braking force, and
when the brake operation is started during execution of the vehicle speed control, provide the brake device with a command commensurate with the additional braking force.

* * * * *